United States Patent [19]

Renner et al.

[11] Patent Number: 4,641,027
[45] Date of Patent: Feb. 3, 1987

[54] INDICATING POSITIONS

[75] Inventors: G. Frederick Renner; Richard K. Thatcher; William G. Atterbury, all of Columbus; Jeremy M. Harris, Worthington; Nile F. Hartman, Westerville; Robert B. McCown, Columbus, all of Ohio

[73] Assignee: Battelle Memorial Institute, Columbus, Ohio

[21] Appl. No.: 683,120

[22] Filed: Dec. 18, 1984

[51] Int. Cl.⁴ .......................... H01J 3/14; G01D 5/34
[52] U.S. Cl. .......................... 250/237 G; 250/231 SE
[58] Field of Search ........ 250/231 R, 231 SE, 237 G; 356/395; 73/800, 862.08, 862.19

[56] References Cited

U.S. PATENT DOCUMENTS 4,047,585 9/1977 Dlugos ........................... 250/237 G Primary Examiner—Eugene R. LaRoche
Assistant Examiner—Steven J. Mottola
Attorney, Agent, or Firm—Philip M. Dunson

[57] ABSTRACT

Typical apparatus as shown in FIGS. 1 and 12 for indicating the relative positions in a given direction between a reference point (24,59) and a test point (29,68) spaced therefrom and movable relative thereto is useful for measurement of the magnitude and direction of static or dynamic torque in a shaft (8). Overlapping transparent reference (20,60) and test surfaces (25,61), either parallel disks (60,61) or coaxial cylinders (20,25) each having a relevant portion covered with a plurality of equally spaced lines oriented predominantly normal to the given direction and at an angle to each other, produce moire fringes (30) when illuminated (14,15). One of the surfaces (25,61), being flexible, is connected to the shaft (8) so as to flex in response to torque between the reference point (24,59) and the test point (29,68), causing a change in the angle between the lines on the two surfaces (20,25;60,61), and thus of the spacing (D) (FIG. 3) of the moire fringe bands (30), which is optically detected (17) and converted, as shown in FIG. 4, to an electrical signal (42) to control power applied to the shaft (8).

36 Claims, 27 Drawing Figures

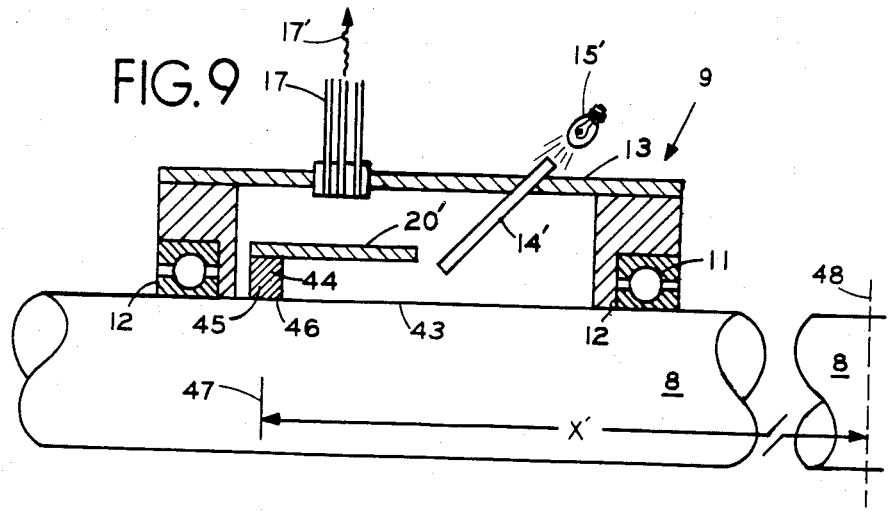
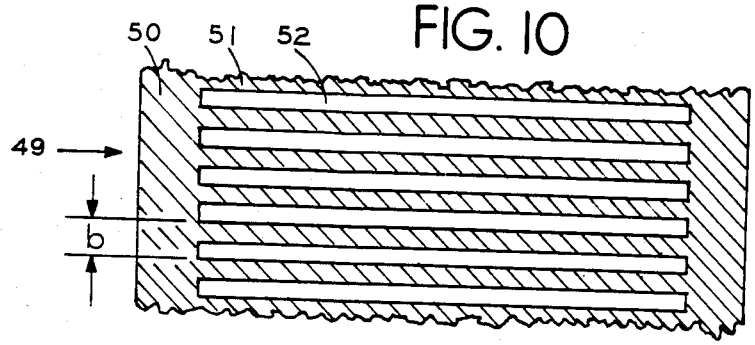
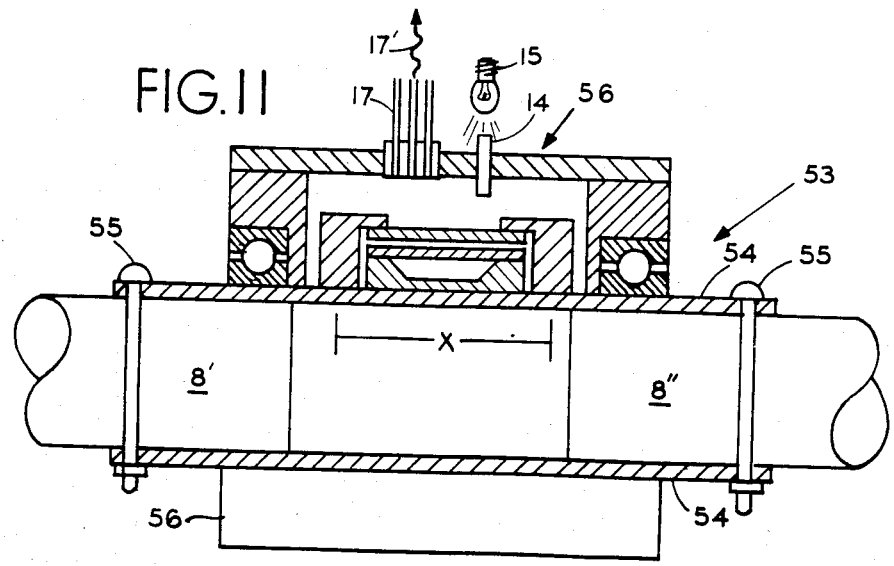

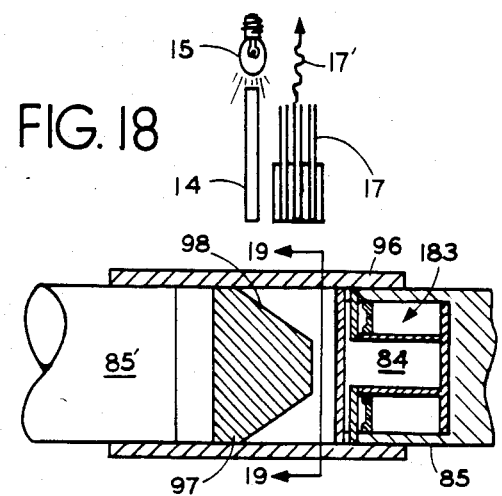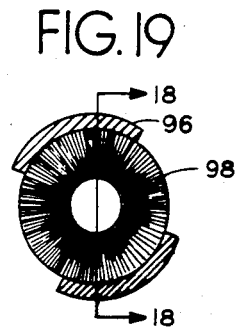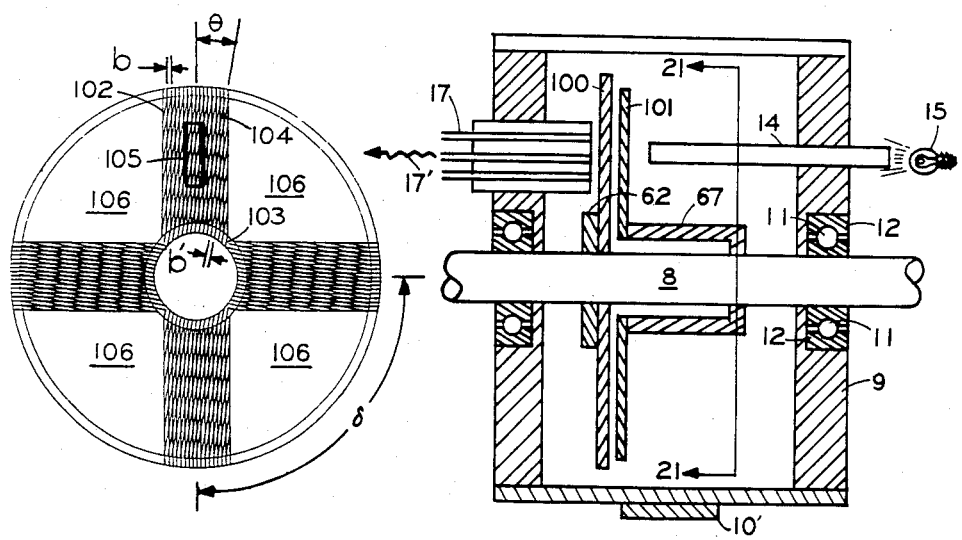

INDICATING POSITIONS

FIELD

This invention relates to apparatus for indicating the relative positions in a given direction between a reference point and a test point spaced therefrom and movable relative thereto. Such apparatus is especially useful for measurement of torque in a shaft by optical methods based on moire fringes for continuous measurement and remote indication of torque in either direction in a shaft under static or dynamic conditions.

BACKGROUND

In the control of power being transmitted by rotatable shafts in various types of equipment, there is a need to continuously measure the static or dynamic torque by an accurate, compact, and low cost device on an integral shaft. One such need is to measure the torque in the drive shaft of an automobile in order to automatically control the power delivered to the wheels.

Optical methods have been disclosed in the prior art which measure the torque at a coupling between two shafts or the torque in an integral shaft.

U.S. Pat. No. 2,811,853, Friedman relates to a device for visual measurement of torque which is essentially a coupling inserted between a drive shaft and a load shaft and is thus not applicable to measuring torque on an integral shaft.

U.S. Pat. No. 3,163,037, Kawabata discloses a device for visual measurement of torque in which the coupling of the drive shaft and load shaft is achieved by use of a torsion bar and thus also is not applicable to measuring torque on an integral shaft. In the patent to Kawabata, the optical members are coaxial cylindrical shells, each attached at one end to the shaft member whose relative angular deflection is to be sensed. Each shell has a longitudinally extending slit intersecting at an angle to define a visual intersection point whose axial position is a function of the angular deflection of the shaft under torsional load. The system operates with a shutter or stroboscopic illuminating means synchronized with the rotational speed and thus cannot be used for static torque measurements. It also has inherently low resolution because of the low information sampling rate and the lack of any form of torque magnification such as can be obtained by moire fringe patterns as in U.S. Pat. No. 2,938,378 of Canada et al.

In the latter patent, the optical members are radially extending disks, each having diffraction gratings thereon. As applied torque causes one of the optical gratings to rotate relative to the other, a pattern of moire fringes is produced. The alternate bands of light and dark fringes passing through a light beam as the shaft rotates are used to modulate the light beam. Photoelectric detection means and processing circuitry are used since the system is not suitable for visual reading. When the shaft is rotating at constant torque, the moire fringe bands are moving past the photoelectric detection means with a frequency proportional to shaft rotational speed. The frequency measured is related to the product of rotational speed and torque, which is horsepower. Thus, to measure torque independently, would require additional circuitry to independently measure rotational speed and factor this effect out of the horsepower measurement. The apparatus of Canada et al is not suitable for measurement of static torque in a non-rotating shaft. This is a serious limitation for application to shafts in vehicles where a measurement of torque is required starting from zero shaft rotation. The system in addition to being bulky in a radial direction, suffers the further limitation that rapid torque transients cannot be measured because of the sampling at intervals by shutter or stroboscopic means.

Some of the aforementioned limitations are avoided in U.S. Pat. No. 3,688,570, Burke, for an angular deflection meter for measuring static or dynamic torque. The optical means are rigidly attached at spaced positions on an integral shaft to measure the relative angular displacement. The optical means consists of two coaxial cylinders as in Kawabata but differs in utilizing the principle of moire fringes as in Canada et al. Burke teaches that the grid pattern on each cylinder should be helical in different directions on each cylinder to create a moire fringe pattern. Relative angular deflection of the cylinders under static or dynamic load causes the circumferential interference moire fringes to move in an axial direction in proportion to the applied load. A small angle $\theta$ between the grid lines on the respective cylinders enhances visibility and maximizes the magnification of the system. The axial movement of the circumferential moire fringes can be observed visually or by an optical system using a light source to illuminate the fringes and including a photodetector and signal processing circuit. Movement of fringes past a slit in a mask in a plane perpendicular to the shaft axis modulates the light received by the photodetector. To determine the direction of torque, additional optical equipment is required involving a neutral density optical wedge. The method disclosed by Burke for determining the direction of torque is complex and requires complex signal processing circuitry and additional components for the optical measurement means. The present invention provides much simpler devices offering novel improvments over the prior art.

DISCLOSURE

Typical apparatus according to the present invention for indicating the relative positions in a given direction between a reference point and a test point spaced therefrom, and movable relative thereto, comprises reference surface means movable in response to movement of the reference point, and having at least a relevant reference portion that is covered with a plurality of substantially equally spaced lines thereon predominantly in a direction normal to the given direction, test surface means movable in response to movement of the test point, and having at least a relevant test portion that is substantially similar and parallel to the relevant reference portion of the reference surface means, and covered with a plurality of substantially equally spaced lines thereon predominantly in a direction normal to the given direction, the relevant portion of each surface means being adjacent and overlapping the relevant portion of the other surface means throughout a useful range of relative positions, and at least one relevant portion being substantially transparent between the lines thereon, and means for illuminating the relevant portions to form moire fringes, the reference surface means and test surface means being so arranged that relative movement between the test point and the reference point having a component in the given direction varies the angle between the lines on the relevant portions of the respective surface means and thus causes the spacing of the moire fringes formed by the lines to vary as a function of the relative positions between the reference point and the test point in the given direction.

This invention is especially useful for measuring the torque in an integral shaft under dynamic or static conditions. Both the magnitude of the torque in the shaft, either positive or negative, and the change in direction of the torque, can be measured simultaneously by measuring the spacing of the moire fringe pattern created (in one typical embodiment) by two coaxial transparent cylinders partially covered with ruled gratings. One end of the inner cylindrical grating is fastened to an element of the shaft and the other end is free. Both ends of the outer cylindrical grating are fastened at displaced elements of the shaft. One of the cylindrical gratings has grating lines that can be parallel to the shaft axis and the other has grating lines at a small angle to the first grating lines to create a series of cylindrical moire fringe bands, approximately perpendicular to the shaft axis. The spacing of the series of moire fringe bands varies with the torque in the shaft and is sensed by a stationary linear optical array arranged parallel to the shaft axis in a non-rotating sealed housing. The latter array senses light transmitted radially outward through the closely spaced overlapping gratings after reflection from a mirror system on the shaft illuminated by light through a transparent portion of the coaxial cylinders from a stationary fiber optic light source in the sealed housing.

The magnitude of the torque in the shaft is related to the spacing of the moire fringes which is sensed and converted by appropriate circuity to a signal that can be used to control the power transferred by the shaft. The positive or negative torque or direction of change in torque is determined by the change in spacing of the moire fringes.

An optional feature of the invention is the magnification of the twisting action on the flexible cylindrical grating at one end by a non-flexible extension of the flexible cylinder to an axially spaced attachment to an element of the shaft to provide leverage and increased sensitivity to torque in the shaft.

The inner coaxial cylindrical grating may be coincident with the shaft surface and have light reflecting material between the grating lines. The light sensing array may comprise photodetectors.

The invention may be modified for use as a torque meter in which the torque sensor has the form of a coupling between a driving shaft and a separate driven shaft.

In another embodiment of the invention, the optical means for measuring torque comprises two transparent disks with nearly radial grating lines that are mounted on the integral shaft in adjacent planes perpendicular to the shaft axis. One disk, which is rigid or flexible, is attached to the shaft at a reference point. The other disk, which is flexible, is attached at its inner radius to an axially spaced test point on the shaft and is attached at its periphery to the periphery of the first disk. The twisting motion of the shaft transmitted to the inner radius of the flexible disk creates a moire fringe pattern of concentric bands. The number of bands (density, inversely proportional to spacing) in the generally radial direction depends on the initial offset angle at zero torque and the applied torque for a particular spacing of grating lines on the disks. The magnitude of the torque in the shaft in either direction, and the direction of change in torque, can be determined by electronically counting the number of moire bands using light transmitted through the disks.

DRAWINGS

Figure 7C:
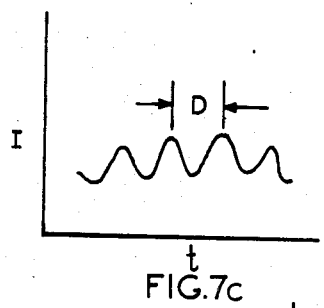
Figure 7B:
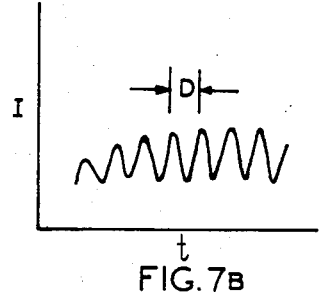
Figure 7A:
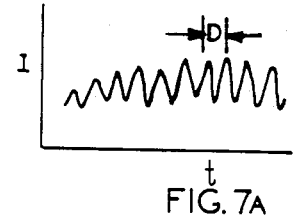
Figure 8:
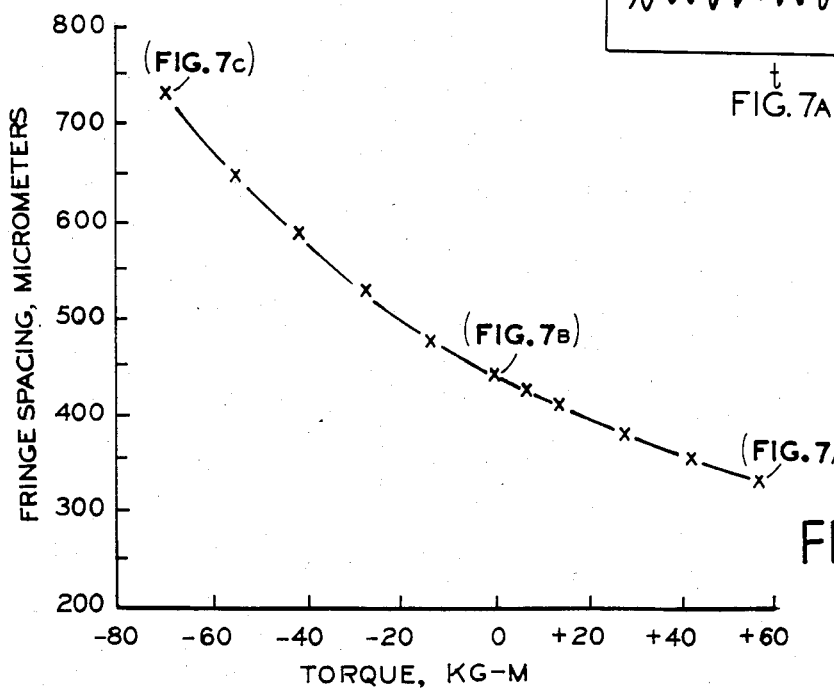

FIGS. 7A, 7B, and 7C show oscilloscope tracings of the signal from the linear array at different static torque loadings as indicated in FIG. 8.

FIG. 8 is a graph of experimental data showing the variation of a moire fringe spacing with applied torque.

FIG. 9 is a schematic front sectional view of another typical embodiment of the torque sensor in which the inner coaxial cylindrical grating is coincident with the surface of the shaft.

FIG. 10 is a schematic view of a section of a one-piece grating.

FIG. 11 is a schematic front sectional view of a typical torque sensor adapted for use as a torque meter coupling two shafts.

Figure 12:
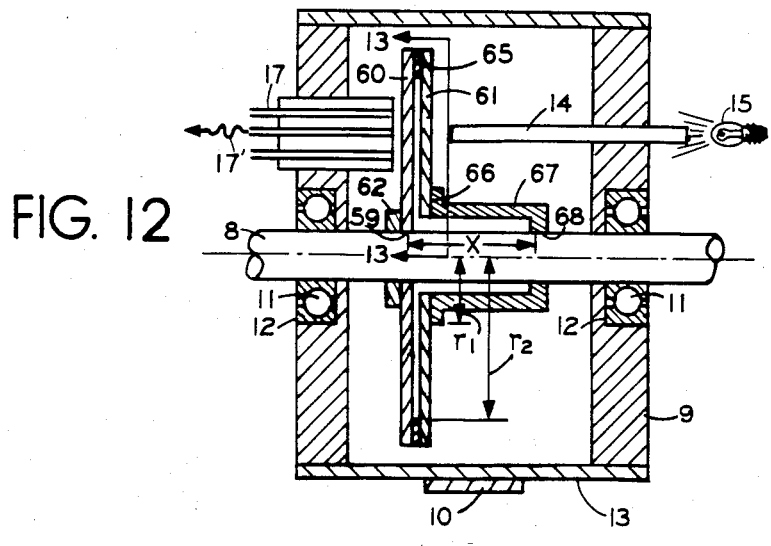

FIG. 12 is a schematic front sectional view of a typical torque sensor in which the optical means are arranged radially on an integral shaft.

Figure 13:
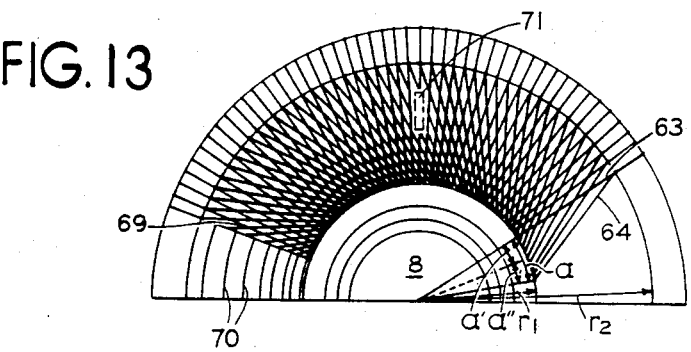

FIG. 13 is a schematic end view as indicated at 13—13 in FIG. 12 showing a typical moire fringe pattern for one rigid and one flexible disk.

Figure 14:
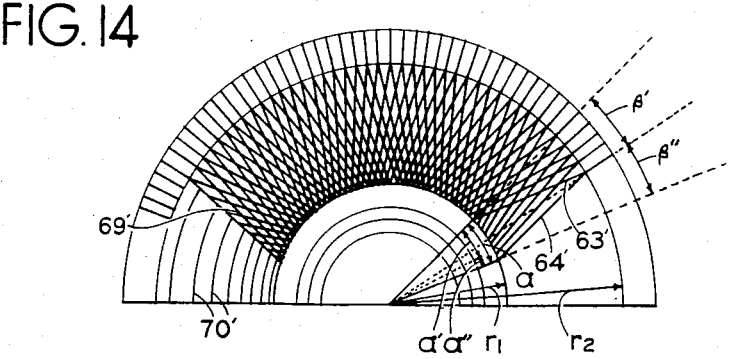

FIG. 14 is a schematic end view as indicated at 13—13 in FIG. 12 showing a typical moire fringe pattern for both disks flexible.

Figure 15:
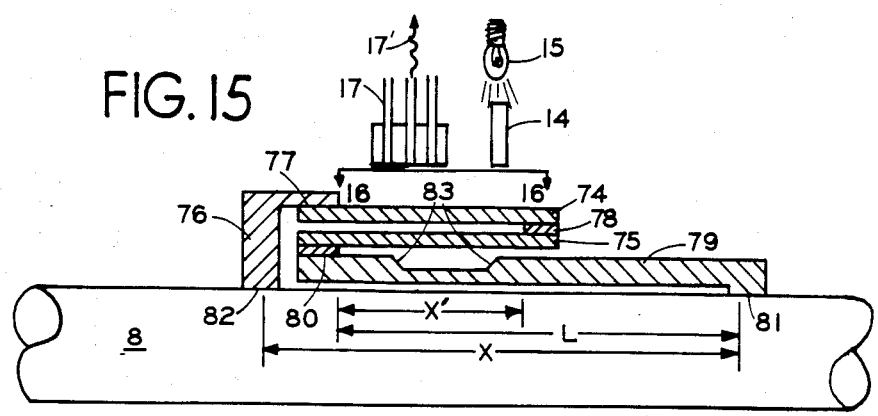

FIG. 15 is a schematic front sectional view of a typical torque sensor minus housing detail using cylinders to show a topological transformation from disks as in FIG. 12.

Figure 16:
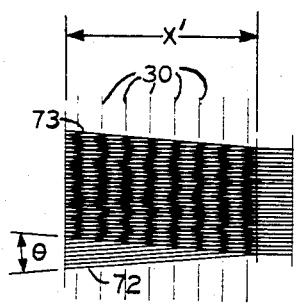

FIG. 16 is a schematic top sectional view as indicated at 16—16 in FIG. 15 showing a typical moire fringe pattern for both cylinders flexible.

Figure 17:
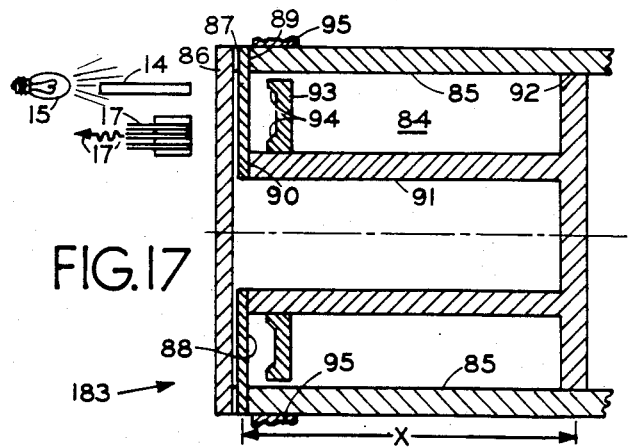

FIG. 17 is a schematic front sectional view of typical optical means positioned in a hollowed end of a shaft.

FIG. 18 is a schematic front sectional view of typical apparatus using optical means somewhat as in FIG. 17, for torque measurement in two coupled shafts.

FIG. 19 is a schematic end sectional view as indicated at 19—19 in FIG. 18.

FIG. 20 is a schematic front sectional view of another typical embodiment of the invention in which the optical means are arranged radially on an integral shaft with both disks rigid.

FIG. 21 is a schematic end sectional view as indicated at 21—21 in FIG. 20 showing a typical moire fringe pattern.

FIGS. 22, 23, 24, and 25 are schematic representations of typical connections of optical surfaces according to the principles of this invention.

CARRYING OUT THE INVENTION

Figure 1:
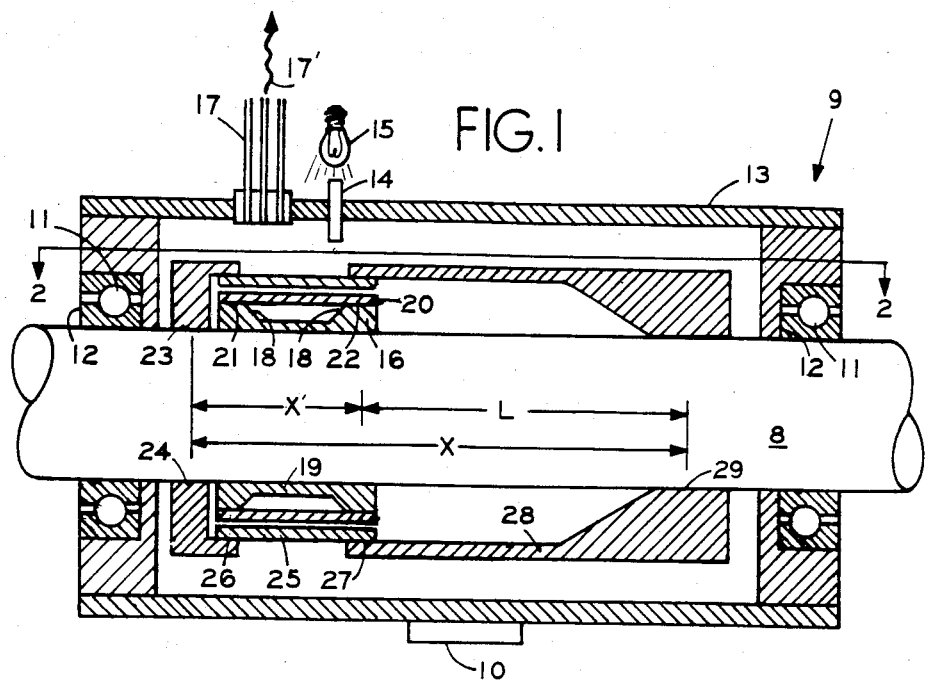
FIG. 1 is a schematic front sectional view of a typical torque sensor according to the present invention mounted on an integral shaft.

FIG. 1 shows a typical embodiment of a torque sensor according to this invention as used to measure the torque in an integral shaft 8 which may be rotating or static. The housing 9 is maintained stationary by the attached arm 10 connected to some rigid body not shown. The housing 9 includes a housing cover 13, bearings 11 for rotation of the shaft 8, and bearing seals 12 which maintain a dust-free environment inside the housing 9.

A fiber optic light transmission cable 14 penetrates the housing cover 13 and carries light from an external source 15. Light reflected from a mirror system 16 is picked up by a linear fiber optic array 17 penetrating the housing cover 13; and the light signal 17' is externally converted to an electric voltage related to torque in the shaft 8 in the signal processing circuit shown in FIG. 4.

The cylindrical mirror system 16 with primary reflecting surfaces 18 is firmly attached to the shaft 8 at an interface 19. A rigid inner cylindrical, partially-ruled transparent grating 20 is firmly bonded to the mirror system 16 at an interface 21 at one end but is not bonded at the interface 22 at the other end. A cylindrical collar 23 is firmly attached to the shaft 8 at an interface 24. A flexible outer cylindrical, partially-ruled transparent grating 25 is firmly bonded at one end to the collar 23 at an interface 26. The other end of the outer cylinder 25 is firmly bonded at interface 27 to a second rigid collar 28 that is firmly bonded to the shaft 8 at an interface 29 axially spaced from the interface 24.

Figure 2:
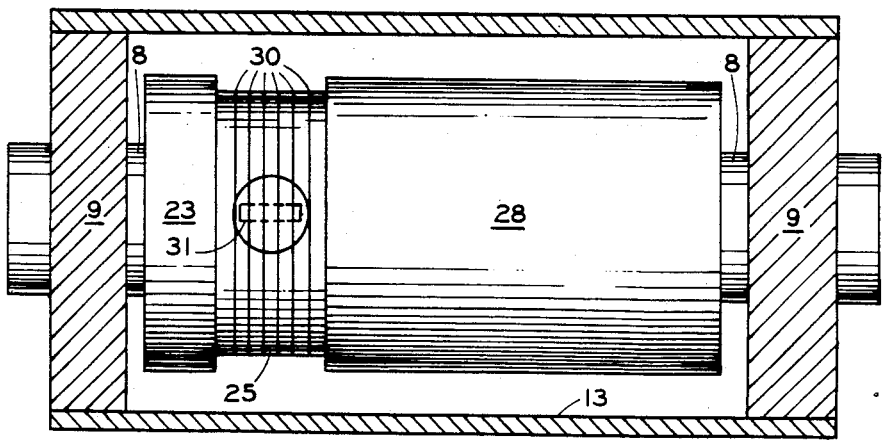
FIG. 2 is a top sectional view as indicated at 2—2 in FIG. 1.

FIG. 2 is a top section view, as indicated at 2—2 in FIG. 1, which shows the moire fringe pattern bands 30 produced by two closely spaced and overlapping ruled gratings 20 and 25. The axial portion of the bands 30 sensed by the linear array 17 is shown by the area 31 enclosed by dashed lines in FIG. 2 and FIG. 3.

Figure 3:
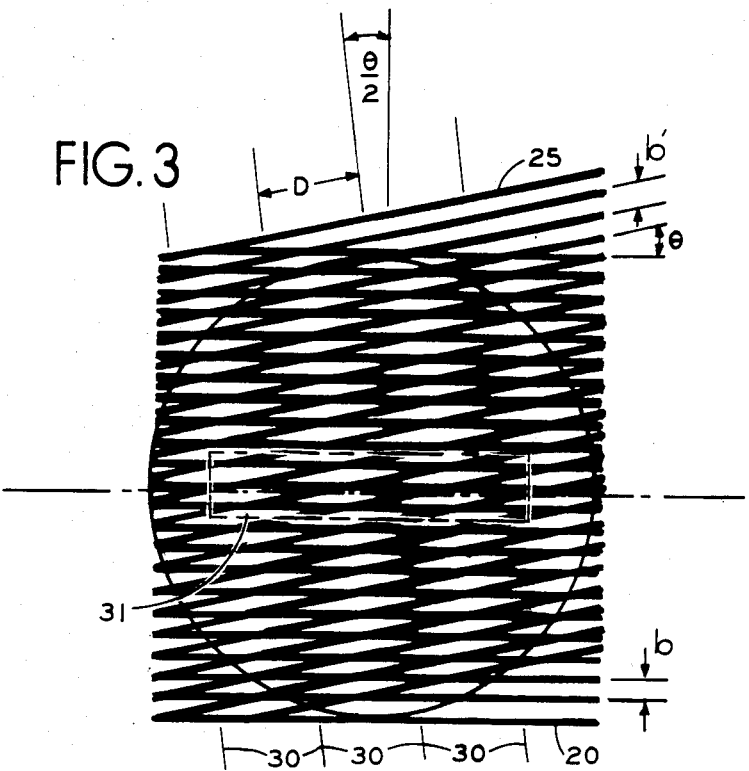
FIG. 3 is an enlarged view of the moire fringe pattern at the location indicated at 31 in FIG. 2.

FIG. 3 is an enlarged view of the moire fringe pattern depicted in FIG. 2 showing the important dimensions, which are the fringe spacing or period D, the inner grating spacing or period b, the outer grating spacing or period b', which may be the same as or different from b, and the angle $\theta$ between the grating lines on the inner and outer cylinders. A moire fringe pattern is created when the outer grating is twisted slightly during assembly to provide a small initial offset angle $\theta'$.

The period D of the moire fringe pattern and the frequency F can be described by the following equations:

$$D = \frac{b}{2\sin(\theta'/2 + aT)} \quad (1)$$

$$F = \frac{1}{D} \quad (2)$$

$$F = \frac{2\sin(\theta'/2 + aT)}{b} \quad (3)$$

Figure 4:
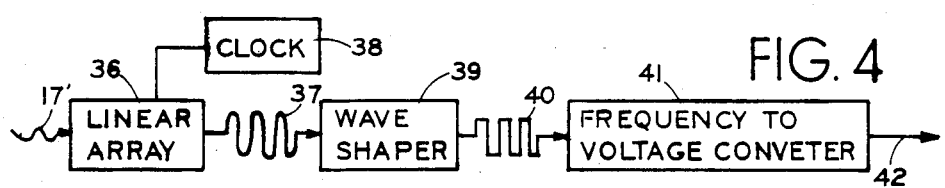
FIG. 4 is a block diagram of typical signal processing circuitry according to the invention.

Where
b = period of linear grating, m
$\theta'$ = initial angular orientation between the two gratings at zero torque, degrees
D = moire fringe spacing, m
T = applied torque, Kg-m
a = constant depending on the diameter of the shaft and the modulus of the shaft, degrees per Kg-m
F = frequency of moire fringe bands, $m^{-1}$ Equation (3) shows the direct relationship between frequency and torque. The moire fringe light pattern as shown in FIG. 3 over a narrow linear portion 31 in FIG. 2 parallel to the axis of the shaft 8 is collected by the linear array of fiber optic cables 17, each of which is connected to photodetectors in the remotely located signal processing circuitry shown in FIG. 4. In FIG. 4, the linear array 36 can consist of photodetectors arranged in a linear array to receive the light signal 17' directly from the moire fringe pattern in one embodiment of the invention. However, in a preferred embodiment of the invention the linear array 36 comprises photodetectors that process light 17' from a linear array of fiber optic cables 17. In either case, a clock mechanism 38 controls the scanning of the light signal from the moire fringe pattern in the area 31 shown in FIGS. 2 and 3. A rapid electronic scan of the linear array 36 in FIG. 4 produces an electrical signal 37 proportional to light intensity which is approximately sinusoidal and which is converted to a square wave 40 in a wave shaper 39 and the square wave frequency is converted in a frequency to voltage converter 41 to a voltage 42 which is directly related to torque T according to equation (3). Alternatively, the square wave signal 40 can be converted to a digital signal, which is often most convenient to use for computerized control systems.

Two important features of the present invention which in combination represent improvements over the prior art are (1) the capability to measure both static torque in a non-rotating shaft and dynamic torque in a shaft rotating at any practical speed and (2) the capability to detect changes in torque direction and both positive and negative torque without the need for additional optical equipment and additional complex electronic circuitry. As can be seen with reference to equation (3), when there is no torque in the shaft (i.e. T=0) the term aT is zero and the frequency (F) is determined by the initial offset angle $\theta'$. The signal processing circuit will produce a voltage corresponding to the zero torque condition. The application of a torque that produces a twisting motion in the shaft in a direction to increase the angle of the gratings relative to the initial offset angle $\theta'$ will increase the frequency F in equation (3) and thus increase the voltage output from the signal processing circuit relative to the voltage at zero torque. Conversely, the application of a torque that produces a twisting motion in the shaft in a direction to decrease the angle of the gratings relative to the initial offset angle $\theta'$ will decrease the frequency F in equation (3) and thus decrease the voltage output from the signal processing circuit relative to the voltage at zero torque.

For a non-rotating shaft, a moire fringe pattern as depicted in FIG. 2 and FIG. 3 will appear on the closely spaced cylindrical gratings 20 and 25 as circumferential bands 30 in planes approximately perpendicular to the shaft axis. As shown in FIG. 3, when the grating lines of the inner cylinder 20 are oriented parallel to the shaft axis and the grating lines of the outer cylinder 25 are offset an initial angle $\theta'$, the plane of the moire bands 30 will be at an angle $\theta'/2$ relative to a plane perpendicular to the axis of the shaft. If the grating lines of the inner cylinder 20 are also offset in the opposite direction to provide a negative initial angle $\theta'$ with respect to the shaft axis, the plane of the bands 30 of the moire fringe would be perpendicular to the shaft axis at least initially. For the latter case, a finite portion of a single band 30 in the measurement area would maintain the same axial position when the shaft is rotating. However, with the application of torque the plane of the bands would be offset some finite angle θ/2 from a plane perpendicular to the axis of shaft rotation. Thus, a finite portion of the band 30 in the measurement area 31 would appear to oscillate axially when the shaft is rotating (i.e. rotating bands would appear to be visually wider). However, this is of no consequence in the present invention because of the rapid scanning by the linear array 36. For example, with a shaft rotating at a practical speed of 2000 RPM, the moire band would make one revolution in about 0.03 seconds. Since the linear array can be scanned in 50 microseconds or less, there would be practically no relative motion or axial oscillation of the bands during the measurement period. Therefore, there is considerable latitude in selection of the angles that the lines of each grating 20 or 25 make with the shaft axis to create the initial offset angle θ'. The initial offset angle θ' is selected such that a range of band frequencies and positive output voltages 42 are covered by both the positive and negative torque ranges to be measured.

An important feature of the present invention that assures maintainance of accuracy during long operating life is that the measurement of torque is related to the measurement of the frequency of the moire bands and not to measurement of the absolute intensity of the reflected light signal. The intensity of the reflected light signal needs only to be within the range required by the signal processing circuit of FIG. 4 to determine the frequency. Thus, any slight deterioration in the intensity of the input light signal 15, any slight deterioration in the reflectivity of the mirror surfaces 18, or any slight deterioration in the linear array optics 17 or photodetectors in the the linear array 36 does not adversely affect the measurement of torque.

Having described a typical embodiment of the invention in FIG. 1, it will be obvious that variations in configuration of the torque sensor can be made. In FIG. 1, are shown two cylindrical gratings 20 and 25 referred to as an inner cylinder and an outer cylinder respectively. A feature of this embodiment is the manner of connection of the cylinder ends indirectly to points on the shaft 8. One cylinder is connected at one end only so that it is not affected by torsion in the shaft 8; the other cylinder is connected at both ends so that it is affected by torsion in the shaft 8. For example, in the embodiment described above, the inner cylinder 20 is connected at one end by the bonds at the interfaces 21 and 19 to the shaft 8. The outer cylinder 25 is connected at one end by the bonds at the interfaces 26 and 24 to a point on the shaft 8, and is connected at the other end by the bonds at the interfaces 27 and 29 to an axially spaced point on the shaft 8. The cylindrical grating, such as 25 in FIG. 1, that is connected at both ends (interfaces 26 and 27) is made of a material that will flex in response to torque.

It is optional whether the inner or the outer cylinder is the one affected by torsion. For example with reference to FIG. 1, in an alternative configuration the outer cylinder 25 still could be connected at one end by the bonds at the interfaces 27 and 29 to the shaft 8, and the other end of the cylinder 25 still could be connected to the collar 23 at the interface 26 but the collar 23 would not be bonded to the shaft 8 with a small space instead of an interface at 24. Thus the cylinder 25 would not be affected by torsion in the shaft 8. The inner cylinder 20 still could be connected at one end by the bond at the interface 21 to the mirror system 16 and could be connected also at the other end by a bond at the interface 22 to the mirror system 16. The mirror system 16 is attached to the shaft along the interface 19. Along the interface 19, the shaft 8 will twist in response to torque and the mirror system 16 will also twist as will the cylinder 20. Assuming that the bonds at the interface 19, the interface 21 and the interface 22 are firm and sufficient to prevent slippage, the mirror system 16 can be made of a material similar to the material of the cylinder 20 or a material similar to that of the shaft 8, or any material that is flexible and will twist in proportion to torsion in the shaft 8. Thus the cylinder 20 and the grating lines thereon will flex in proportion to the relative twisting motion in the shaft between the ends of the cylinder at the interfaces 21 and 22. The short distance between the interfaces 21 and 22 will result in a small amount of flexing of inner cylinder 20, which is adequate for many applications.

Having one of the cylindrical gratings connected to the shaft at both ends is a distinguishing feature of this invention that is different from the prior art such as in U.S. Pat. No. 3,668,570, Burke, where the cylindrical gratings are attached at only one end. In the present invention, by connecting one of the cylindrical gratings, made of flexible material, at both ends, it will flex in such a manner that the angle θ between the gratings as shown in FIG. 3 will change in response to torque in the shaft. This change provides a simple means to determine the magnitude and the direction of the torque.

Figure 5:
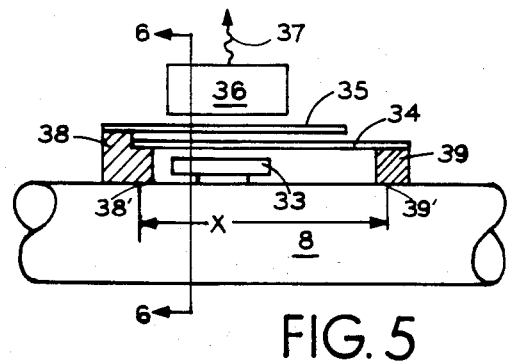
FIG. 5 is a schematic front sectional view of an alternative arrangement of the sensor for experimental measurement of static torque.
Figure 6:
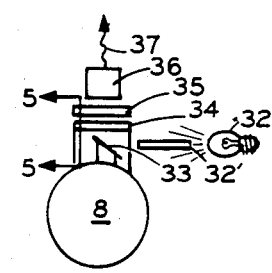
FIG. 6 is an end sectional view as indicated at 6—6 in FIG. 5.

FIGS. 5 and 6 show an alternative embodiment of the present invention which was used for experimental demonstration of the technical feasibility of the torque measurement principles under conditions of static torque in the shaft 8. The incoming light from an external source 32 via a fiber optic cable 32' was reflected 90° by the mirror 33 attached to the shaft 8 and transmitted through the closely-spaced, flat, rectangular gratings 34 and 35 and picked up by a detector array 36 to produce an output signal 37. A flexible grating 34 was bonded at its left end to a collar 38 which was attached at a point 38' on the shaft 8 and was bonded at its right end to a collar 39 which was attached to an axially spaced point 39' on the shaft 8. A fixed grating 35 was bonded at only its left end to the collar 38. For measurement of static torque, one end of the shaft 8 was restrained from rotating and the opposite end of the shaft 8 was subjected to various amounts of torque by an attached lever arm and weights not shown in FIGS. 5 and 6.

A demonstration of the change in fringe period with torque was performed using the apparatus as shown in FIGS. 5 and 6. The grating 35 was made of glass and had parallel grating lines of 3 micrometers width alternating with clear transparent glass of 3 micrometers width (i.e. grating period was b=6 micrometers). A flexible grating 34 was prepared similarly except that the material was a transparent polycarbonate plastic (Tradename: Lexan). The dimensions of the gratings 35 and 34 were 0.0625 inch thick, 0.5 inch wide, and 2 inches long in the direction of the shaft axis. The cylindrical steel collars 38 and 39 had a flat surface milled at the top to which the gratings were bonded using an epoxy glue. The light source 32 was an incandescent light bulb of 12 microwatts. The light was conducted by a fiber optic cable 32' and collimated before reflection from the mirror 33. There was a space of 125 micrometers between the gratings 35 and 34 and a space of 125 micrometers between the grating 35 and the detector array 36. The linear detector array 36 was a 256-element array with photodetector sensing elements of 13 micrometers by 17 micrometers arranged linearly and parallel to the shaft axis with 13 micrometers center to center spacing for a linear sensing length of about 3330 micrometers. The linear array 36 included self-contained clock circuitry for automatic scanning of the photodetector elements in 50 microseconds to determine the light intensity across the moire fringe bands. The electrical output signal 37 from the detector 36 was connected to a standard oscilloscope not shown in FIGS. 5 or 6 to visually observe the period of the moire fringes. A static torque was applied by weights at one end of the shaft 8 and measured by a strain gage attached to the surface of the shaft 8 covering the practical range of shaft torque from +100 Kg-m to −150 Kg-m. FIGS. 7A, 7B, and 7C show the typical oscilloscope traces of light intensity (I), versus time (t) obtained at torque values of +55.4 Kg-m, 0 Kg-m, and −69.4 Kg-m from which the fringe period D was determined (i.e. fringe spacing $$D = \frac{\text{length of linear array}}{\text{number of cycles}}$$

and plotted in FIG. 8. The experimental curve in FIG. 8 shows fringe spacing D in micrometers versus torque T in kilogram-meters (Kg-m) according to equation (2) where $$D = \frac{6 \times 10^{-6}}{2 \sin(0.80/2 + 0.0023T)}$$

for grating period $b = 6 \times 10^{-6}$ meters, initial offset angle at zero torque of $\theta' = 0.80$ degrees and an apparatus constant $a = 0.0023$ degrees per Kg-m.

While the above experimental data were obtained with a non-rotating shaft 8 to measure static torque, data similar to that shown in FIGS. 8 and FIGS. 7A, 7B, and 7C would be obtained with a rotating shaft to measure dynamic torque. For measurement of dynamic torque in the embodiment shown in FIGS. 5 and 6 the shaft 8 can be driven from one end and dynamically loaded at the opposite end. The light source 32 can be a stroboscope that flashes as the gratings and mirror system pass the detector array 36, or the light source 32 can be continuous and the detector array 36 can be synchronized to scan the moire fringe pattern when the gratings and the mirror system are in the appropriate position as illustrated in FIG. 6. The light intensity received by the detector array reaches a maximum once each revolution of the shaft and can serve as the automatic triggering means for the detector scan of the moire fringe pattern. If in lieu of an oscilloscope used in experimental work the output signal 37 from the linear array of photodetectors 36 were used with the signal processing circuit of FIG. 4, the wave shaper 39 could be used to produce a signal 40 for a digital display or the signal 40 could be processed by a frequency to voltage converter to produce an analog signal 42 that could be read as a voltage by a voltmeter not shown in FIG. 4. For practical application to an automobile drive shaft the signal 42 representing torque in the shaft could be used to control the power delivered by the engine and/or transmission.

In an embodiment of the invention as shown in FIG. 1 representing apparatus as might be used on the drive shaft 8 of an automobile, there are environmental, material, and design considerations to insure long operating life. One environmental consideration is temperature, which typically could be as high as 180° C. For convenience, photodetectors were used as the linear sensing array 36 in FIGS. 5 and 6 for the experimental study at room ambient temperature, and were mounted close to the grating 35 since they can operate at up to 55° C. and can be stored at 100° C. For some practical applications, it is preferred to locate the linear array 36 remotely, where temperatures are lower, and to use glass fiber optic cables 17 as in FIG. 1 to conduct the light signal 17' to the photodetectors. Thus, the term linear array can include fiber optic cables and/or photodetectors. For example fiber optic cables 17 in FIG. 1 are arranged in a linear array to collect the light from the moire fringe pattern over the dashed area 31 shown in FIGS. 2 and 3. The light signals 17' are conducted to the remote photodetectors 36, which need not be arranged in a linear array in the signal processing circuit shown in FIG. 4.

Possible high temperature in the operating environment where the torque sensor is attached to the drive shaft can affect the choice of grating material. Optical glass can be used as the substrate for the grating that is attached at one end only. The other grating that is attached at both ends and is subjected to twisting motion as the shaft is twisted in proportion to torque must be more flexible. A clear plastic substrate is preferred for the flexible grating. Polycarbonate was satisfactory for low ambient temperature use as in the experimental study. A polypropylene copolymer can be used to a maximum operational temperature of 200° C. Preferred materials for high temperature are polysulfone and polyether sulfone. Polyether sulfone is an optically clear amorphous plastic and a suitable commercially-available resin is VICTERX PES300P manufactured by ICI America's, Inc. which combines the necessary high temperature properties and fatigue strength.

As shown in equation (3), the frequency F is inversely proportional to the period of the linear grating b. Small values of b are desired so that the value of the frequency F is relatively large (i.e. the period of the moire fringe D is small in equation (1) so that the frequency measurement can be made over a relatively small axial length in area 31 shown in FIG. 2 to reduce the size of the linear array 17 required. In general, gratings with a period of $b = 2 \times 10^{-6}$ meter to $20 \times 10^{-6}$ meter are preferred. These gratings have much smaller periods than the Ronchi rulings of 175 lines per inch ($b = 145 \times 10^{-6}$ meter) of U.S. Pat. No. 2,938,378, Canada et al, which would not be practical to use in the present invention.

The frequency F is also proportional to sine $\theta$ where the angle $\theta$ in FIG. 3 comprises two terms shown in equation 3. The first term is one-half the initial offset angle $\theta'$. The second term is also equivalent to one-half of an angle $\theta''$ related to torque as follows:

$$\theta''/2 = aT \qquad (4)$$

The value of the apparatus constant "a" in equation (4) is inversely proportional to the third power of the shaft diameter, d, and the modulus, G, of the shaft material as shown by the following equation:

$$\theta''/2 = \left[\frac{147}{d^3 G}\right] T = aT \qquad (5)$$

where $\theta''$ = angle between two gratings resulting from torque in shaft, degrees d = diameter of shaft, m G = modulus of shaft, Kg/m²
T = torque, Kg-m
a = apparatus constant, degrees per Kg-m.

Equation (5) is applicable to the embodiment of the invention as shown in FIG. 5 where the axial length X' of the flexible grating 34 and the axial separation X of the points 38',39', on the shaft 8 have practically the same value.

For purposes of discussion, a reference point 38' is, as shown in FIG. 5, located on the circumference of the shaft at a reference section of the shaft (i.e. a plane perpendicular to the shaft axis. A test point 39' is located on the circumference of the shaft at an axially spaced section of the shaft (i.e. axially spaced by a distance X as shown in FIG. 5). When the shaft twists as a result of torque, the test point 39' will move on the circumference of the shaft at the test section. For schematic drawings, such as FIG. 5, for example, the sections for dimensioning are located near the midpoint of the attachment of the collars 38,39 to the shaft 8 for illustration purposes. In the above context, the terms "point" and "section" are sometimes used interchangeably herein.

As shown by equation (5), the angle $\theta''$ is independent of the length of the flexible grating X'. For small diameter shafts, an adequate angle $\theta''$ can be achieved. For example, using equation (5) and assuming a steel shaft (i.e. $G = 7.8 \times 10^9$ Kg/m²) of 0.025-meter diameter, the flexible grating 34 in FIG. 5 would flex by an angle of about $\theta'' = 0.23$ degree for a torque of T = 100 Kg-m. For a 0.05-meter diameter shaft, the flexible grating 34 would flex only about $\theta'' = 0.03$ degree for a torque of T = 100 Kg-m.

A useful feature of this invention is a way of obtaining leverage to increase the angle $\theta''$ for a given torque as illustrated in FIG. 1. As shown in FIG. 1, the approximate axial length of the flexible cylinder 25 is X' and the axial length of a rigid leverage cylinder 28 is L. The leverage cylinder 28 is attached to the shaft at the interface 29 which is an axially spaced section of length X = X' + L from the reference section where the other end of the flexible cylinder 25 is attached to the shaft through the interfaces 26, 24. The use of a rigid leverage cylinder 28 magnifies the effect of flexure on the flexible cylinder 25 through an angle $\theta''$ by transmitting the greater twisting motion of the shaft over a distance X compared to a distance X'. The magnification obtained is $$\frac{X' + L}{X'} = 1 + \frac{L}{X'}$$

and a more general form of equation (5) is $$\theta''/2 = \left[\frac{147}{d^3 G}\left(1 + \frac{L}{X'}\right)\right] T = aT \quad (6)$$

where
L = axial length of rigid cylinder
X' = axial length of flexible cylinder

For example, using equation (6), in the preceding example for a 0.05-meter diameter shaft, $\theta'' = 0.03$ degree per 100 Kg-m torque when L = 0, but $\theta'' = 0.24$ degree per 100 Kg-m torque if X' = 0.0125 meter and L = 0.0875 meter. This embodiment of the invention which provides for a rigid leverage cylinder 28 as shown in FIG. 1 is particularly advantageous in providing a desirable angle $\theta''$ for applications where the radius of the shaft 8 is larger than usual, or where the modulus G of the material of the shaft is larger than usual, or where the torque T to be measured is smaller than usual as can be seen from equations (3), (4), and (6) and FIG. 1.

In one embodiment of the invention, as shown in FIG. 9, the cylindrical surface 43 of the shaft 8 can be used in lieu of a flexible inner cylinder. A grid pattern is provided on the cylindrical surface 43 with grid lines parallel to the shaft axis or offset an initial angle $\theta'$. The area between the grid lines on the cylindrical surface 43 is made reflective so that light from a source 15' which is transmitted through a glass fiber optic cable 14', positioned at an angle to the shaft axis, is reflected from the reflective surface between the grid lines on the cylindrical surface 43 through the outer cylindrical grating 20' to the linear array detector 17. The outer cylindrical grating 20', which is not affected by torsion in the shaft 8, can have grid lines parallel to the shaft axis or offset an initial angle $\theta'$.

The cylindrical grating 20' is attached at one end at an interface 44 to a collar 45 which is attached at an interface 46 to a reference section 47 of the shaft 8. The effective length X' of the cylindrical surface 43 of the shaft 8 extends from the reference section 47 to an axially spaced section 48 near the end of the shaft 8 indicated by the dashed line 48 representing the loading on the shaft which results in torsional twist of the shaft. The surface of the cylindrical shaft flexes in proportion to the torque to produce an angle $\theta''$ between grating lines. While the distance X' shown in FIG. 9 can be any distance longer than the housing 9, the grating lines on the cylindrical surface 43 need only extend over a small axial length within the housing 9 comparable to the axial length of the fixed cylindrical grating 20'. For this embodiment of the invention, it is not possible to obtain the magnification discussed previously with reference to FIG. 1 by use of a leverage cylinder 28. However, for many applications involving shaft diameters on the order of 0.025-meter or less, an adequate angle $\theta''$ can be achieved according to equation (5) or the equivalent in equation (6) with L = 0.

There are several special advantages of the embodiment of the invention shown in FIG. 9 wherein the cylindrical surface 43 of the shaft (e.g. steel) serves as the inner flexible cylinder that contains grating lines over a small axial length within the housing 9. One advantage is that there is less concern for the flexible cylinder 43 withstanding repeated flexure without failure. Another advantage is that there are no collars or interface bonding surfaces for the cylindrical grating surface 43. Another advantage is that there is less concern for application in a high temperature environment. For this embodiment, the cylindrical surface 43 can comprise a highly polished and reflective section of the shaft 8 on which are produced grating lines by photochemical or other methods. The polished surface 43 might also comprise a thin layer of reflective chromium for tarnish protection and the grating lines could be non-reflective black chromium. Alternatively, the inner cylindrical grating 43 could comprise a preformed foil of reflective tape containing non-reflective grating lines and foil thickness of 1 mm or less that could be wrapped tightly around the shaft 8 and fastened by an appropriate glue or cement over a section within the housing 9.

For the embodiment of the invention shown in FIG. 9, the cylindrical grating 20' that is rigid and not subject to torsional flexure can comprise a substrate of optical glass or temperature-resistant transparent plastics that are provided with grating lines. The grating lines can extend the axial length of the fixed cylinder 20′ or only over a portion of the axial length from the reference section 47 with the remainder of the length free of grating lines. As shown in FIG. 9, the fiber optic cable 14′ can be positioned at an angle such that the incident light does not pass through the outer cylindrical grating 20′ before being reflected from the surface 43. Alternatively, the fiber optic cable 14′ can be positioned at a larger angle to the shaft axis so that light passes through the outer cylinder 20′ near the free end before being reflected from the surface 43, in which case there is less interference with the light if the free-end of cylinder 20 is free of grating lines. For similar reasons, in FIG. 1, the grating lines need extend only over an axial portion of the outer cylinder 25 and the inner cylinder 20 under the linear array 17. Thus incident light from the fiber optic cable 14 can pass through an axial portion of the outer cylinder 25 and the inner cylinder 20 which are free of grating lines before initial reflection from mirror surfaces 18.

Gratings of the desired period b can be prepared on thin transparent substrates such as glass or plastic by a variety of methods known in the art. FIG. 10 shows an alternative type of grating 49 that can comprise a thin sheet of metal 50 containing elongated slots 52 and opaque grating lines 51. The slots 52 can be formed in the sheet mechanically, or by photoetching or other means. Alternatively, the grating 49 can be prepared by electroforming a metal 50,51 such as nickel on a mandrel prepared with a suitable photoresist so that the slots 52 are left void of metal. A one-piece cylindrical grating 49, as shown in FIG. 10 that is made of metal such as nickel with high temperature tolerance is advantageous for use as the fixed cylindrical grating 20′ in FIG. 9 where the flexible cylindrical grating 43 is the surface of the shaft and is also metal for high temperature tolerance. A thin one-piece cylindrical grating 49 as in FIG. 10 could also be used as the flexible grating 25 or fixed grating 20 in FIG. 1. While metal is preferred for the one-piece grating 49 shown in FIG. 10, it could be made by producing slots 52 in a thin opaque plastic sheet 50,51.

This invention can also be adapted for use as a torque meter 53 to measure the torque between a driving shaft 8′ and a driven shaft 8″ as shown in FIG. 11. The torque meter 53 comprises a coupling 54 between the shafts 8′,8″, that is attached by bolts 55 or other means and a torque sensor 56 similar to that described previously in FIG. 1 which is firmly attached to the coupling 54. Torque which results in a twisting motion in the coupling 54 between two sections of the coupling over an axial distance X is measured as previously described. While leverage to increase the angle $\theta''$ can be used as in FIG. 1, it is usually not required for a torque meter as shown in FIG. 11 since there is latitude in design of the coupling 54 for flexibility for shafts 8′,8″ of various diameters. The wall thickness of the typical steel coupling 54 is selected in relation to the inside diameter of the coupling 54 or diameter of the shafts 8′,8″, so that the apparatus constant "a" in equations (1) and (3) has a suitable value in degrees per unit torque.

FIGS. 12 and 13 show another embodiment of this invention, in which the ruled gratings are on radially extending transparent disks 60,61. The fixed rigid disk 60, which is attached to the shaft 8 at a reference section at an interface 59 and can be held in place by a collar 62, has a plurality of equally spaced grating lines 63 extending in a radial direction to cover a portion of the disk 60 surface as shown in FIG. 13. A second flexible disk 61, containing a similar plurality of equally spaced grating lines 64 extending in a substantially radial direction, to cover a portion of the surface of the disk 61, is attached at the outer periphery to the fixed rigid disk 60 by a bond 65 or other means and is attached at an inner radial interface 66 to a collar or rigid coaxial cylinder 67 which is attached to an axially spaced section of the shaft 8 at an interface 68. The disk 61, which is affected by torsion in the shaft 8, is flexible between the outer radius $r_2$ and the inner radius $r_1$ as shown in FIGS. 12 and 13. As illustrated in FIG. 13, at the outer radius $r_2$, the grating lines 63 and 64 are assumed to be coincident.

Rotation of the flexible disk at the inner radius $r_1$ through an angle $\alpha$ displaces the grating line 64 on the flexible disk 61 relative to the reference grating line 63 on the fixed disk 60. A series of coaxial moire fringes 69 are formed which appear as bands 70 of increasing period at increasing radius regardless of whether the shaft 8 and attached disks 60,61 are rotating or static. The number of bands appearing between the radii $r_1$ and $r_2$ is equal to the product of the number of grating lines per degree and the angle $\alpha$. For example, assuming that both disks have 100 grating lines per degree, and an initial offset angle $\alpha$ of 0.8 degrees is produced by slight twisting of the flexible disk 61 at the radius $r_1$ by twisting the rigid cylinder 67 before attachment to the shaft 8 at the interface 68, a total of 80 moire fringe bands 70 will appear between the radii $r_1$ and $r_2$. The total angle $\alpha$ consists of the intial offset angle $\alpha'$ and the subangle $\alpha''$ resulting from torque in the shaft 8 which is determined by the following equation:

$$\alpha'' = \frac{584\ TX}{d^4 G} \qquad (7)$$

where
$\alpha''$ = angle of twist of shaft from torsion, degrees
T = torque, Kg-m
X = axial distance between attachments to the shaft of the fixed disk and flexible disk, m
d = shaft diameter, m
G = shaft modulus, Kg/m$^2$ For example, assuming a steel shaft (G = 7.8 × 10$^9$ Kg/m$^2$) of diameter d = 0.025 m and a distance X = 0.025 m in FIG. 12, for a torque of 100 Kg-m, the subangle $\alpha''$ = 0.46 degree from equation (7). Thus with an initial offset angle $\alpha'$ = 0.80 degrees and 100 grating lines per degree, the angle $\alpha$ would be 1.26,0.80, and 0.34 degrees for torques of = 100 Kg-m, 0 Kg-m, and −100 Kg-m, respectively, and produce 126, 80 and 34 bands, respectively, between the radii $r_1$ and $r_2$. Thus, the frequency of the bands 70, or number of bands per unit radial dimension, varies with torque in the shaft and the frequency can be measured by suitable circuitry as shown in FIG. 4 to produce an appropriate signal. If the linear array 17 has a radial dimension equal to the difference between the radii $r_1$ and $r_2$, all of the bands produced will be included in the measurement of frequency. If the linear array 17 measures the bands over a smaller radial distance than the difference between the radii $r_1$ and $r_2$, such as the area 71 in FIG. 13, fewer bands will be included in the measurement, and frequency will also depend on the effective radius of the area 71. However, band frequency will be a function of torque allowing measurement of both positive and negative torque, and change in direction of torque for both static and dynamic torque in the shaft 8.

As shown by equation (7), the distance X can be increased to compensate for larger than normal shaft diameter, d, or larger than normal shaft modulus, G, to produce an acceptable angle $\alpha''$ in response to torque. In effect, the rigid coaxial cylinder 67 shown in FIG. 12 can be extended axially to increase the value of X to provide leverage and increase the twisting angle on the flexible disk 61 while maintaining the disks 60 and 61 in close spaced relationship to provide the sharpest contrast of the moire fringe bands 70.

The flexible disk 61 can be made of a suitable thin plastic or other material and provided with radial grating lines by appropriate methods known in the art. The flexible disk 61 might also comprise a plurality of segments to increase its flexibility for movement in a plane perpendicular to the shaft axis.

For the embodiment of this invention shown in FIG. 12, the basic design principle is that one rigid grating is fixed at one end to the shaft and the other flexible grating is fixed at one end and free to move at the other end in response to torque. In the embodiment shown in FIG. 12, the flexible disk is fixed at the outer radius $r_2$ and free to move at the inner radius $r_1$. Alternatively, the flexible disk 61 can be fixed to the shaft or the fixed disk at the inner radius by moving the bond 65 to the inner radius and the rigid coaxial cylinder 67 can be increased in radius and attached to the flexible disk at its outer periphery. The results with regard to measurement of frequency of moire fringe bands in response to torque in the shaft can be similar to those described previously for the modification in FIG. 12. However, means for providing light through the transparent disks may be complicated by the rigid closed-end cylinder attached at the outer periphery of the disk 61 and also to the shaft at the interface 68. The fiber optic cable 14 may penetrate the non-rotating housing 9 on the same side as the linear array 17 and by use of mirrors reflected light may be used to produce the moire fringe bands 70.

In the embodiment of the invention as shown in FIGS. 12 and 13, the disk 60 attached to a reference section of the shaft 8 at the interface 59 was assumed to be rigid. Thus, the grating line 63 remains essentially radial as shown in FIG. 13. It is not essential that the disk 60 be rigid. It may be flexible and similar to the flexible disk 61, to achieve certain design advantages. For example, assume that the disk 60 is flexible, similar to the disk 61, and attached to the shaft 8 at the interface 59 and bonded to a collar 62 of outer radius $r_1$ and thus can flex between the radii $r_1$ and $r_2$. The disk 61 rotates through an angle $\alpha$ comprising the initial offset angle $\alpha'$ and the angle $\alpha''$ due to torque in the shaft the to offset grating line 64' relative to the grating line 63' at the radius $r_1$ as shown in FIG. 14. Since both disks 60 and 61 are flexible in a plane perpendicular to the shaft axis, the outer periphery of the disks 60 and 61, joined by a bond 65 as shown in FIG. 12, move through an angle $\beta' + \beta''$ as shown in FIG. 14. The grating line 63' is offset at the radius $r_2$ by movement of the outer periphery of the disk 60 due to force exerted by flexure of the disk 61 from twisting motion on the disk 60 through the angle $\alpha$ at the radius $r_1$. In effect, the total flexure has been distributed between the two disks, 60 and 61, which reduces the flexure requirement on any one disk for the same angle $\alpha$. If the disks 60 and 61 are nearly identical in material, thickness, and flexure response between the radii $r_1$ and $r_2$, the flexure may be approximately evenly divided between the disks 60 and 61 and the angles $\beta'$ and $\beta''$ may be equal as shown in FIG. 14. Either disk 60 or 61 may be flexible or rigid provided that at least one is flexible. As shown in FIG. 14 and described previously in relation to FIG. 13, moire fringes 69' are formed as coaxial bands 70' regardless of whether the disks are stationary or rotating. The number of bands 70' depends on the number of grating lines per degree and the angle $\alpha$, and the measurement of the frequency of the bands 70' can be used to determine the amount and the direction of any torque in the shaft 8.

It has been assumed for discussion that the grating lines on the disks are initially radial. However, straight radial lines are not essential. The grating lines on the disk may be curved or spiral out from the center of the disk, provided the lines are equally spaced. Also, for purposes of illustration in FIGS. 13 and 14, straight grating lines are shown between the radii $r_1$ and $r_2$. However, this is not essential, and the grating lines 63' and 64' in FIG. 14, for example, might be curved as a result of disk flexure in operation without affecting the principle of operation of this invention. Also in FIG. 14, for example, for purposes of illustration, the grating lines 63' and 64' are shown as coincident at the radius $r_2$ and outward to the periphery. The grating lines 63' and 64' need not be coincident at the radius $r_2$, but they should maintain their initial relative positions after the disks 60 and 61 are joined by the bond 65 as shown in FIG. 12.

FIGS. 15 and 16 show an alternative embodiment of this invention in which the grating lines 72 are on a transparent cylinder 74 and the grating lines 73 are on a transparent cylinder 75. In FIG. 15, a flexible cylinder 74 is attached to a rigid collar 76 at an interface 77. The other end of the cylinder 74 is connected to a flexible cylinder 75 by a bond 78. The other end of the cylinder 75 is connected to a rigid cylinder 79 by a bond 80. The rigid cylinder 79 is connected to the shaft 8 at an interface 81 at an axially spaced section of the shaft 8 relative to the reference section of the shaft where the collar 76 is attached at an interface 82. The moire fringe bands 30, formed as illustrated in FIG. 16, appear as shown in FIG. 2, and their spacing is measured in a small axial area 31, with apparatus and procedures as described for FIG. 1. In FIG. 15, which omits the detail of the stationary housing 9 of FIG. 1, the mirror system is part of the rigid cylinder 79, with mirror surfaces 83 in FIG. 15 similar to the mirror surfaces 18 in FIG. 1.

A comparison of FIG. 15 with FIG. 12 illustrates the topological transformation from disks in FIG. 12 to cylinders in FIG. 15. FIG. 16 shows the moire fringe pattern when both cylinders 74 and 75 are flexible and free to flex over the axial distance X'. The advantage is a distribution of the flexure between the two cylinders for a given angle $\theta$. FIG. 16 for cylinders is analogous to FIG. 14 for disks except that for the cylinders the moire band 30 spacing is uniform for a constant angle $\theta$ and thus the spacing is constant over the distance X' whereas for disks, the spacing varies as the square of the radius. For either disks or cylinders, the spacing can be measured to indicate the amount of positive or negative torque and the direction of the torque for either static or dynamic conditions.

As noted in the discussion of disks in relation to FIGS. 12 and 14, there is an advantage when both surfaces are flexible, such as the cylindrical gratings 74 and 75 in FIG. 15, in that flexure in response to torque is distributed between the two surfaces. Where the cylinders 74 and 75 are designed to provide equal response to flexure over the distance X', the angle of the grating lines 73 with the shaft axis and the angle of the grating lines 72 with the shaft axis are each $\theta/2$ over the range of total angle $\theta$ (FIG. 16) in response to torque in the shaft 8. Thus, the moire fringe bands 30 are approximately perpendicular to the axis of rotation the of shaft 8 regardless of the torque being measured and appear as coaxial bands when the shaft is rotating (i.e. no axial movement of moire bands during revolution at constant torque). This feature is desirable for visual observation of moire fringes on a rotating shaft, or when the scanning rate of the linear array 17 is slow and approaching the rate of shaft rotation.

The embodiment of the invention using disks as the optical means in a torque sensor for an integral shaft can also be adapted for use as a torque meter between a driving shaft 8' and a separate driven shaft 8" as shown in FIG. 11 where the optical means comprises cylinders.

FIG. 17 shows still another embodiment of this invention, wherein the optical means 183 is positioned in a cavity 84 in one end of a cylindrical hollow shaft 85 or a solid cylindrical shaft 85 that has been provided with a cavity 84 at one end. The optical means 183 comprises a rigid transparent disk 86 connected at its outer periphery by a bond 87 to the outer periphery of a flexible transparent disk 88 which is connected at an interface 89 to the end of a hollow shaft portion 85. The inner radius of the disk 88 is attached at an interface 90 to a rigid cylinder 91 which is attached at an interface 92 to the inner surface of the hollow shaft portion 85 at an axially spaced section of the shaft 85. A mirror system 93 with reflective surfaces 94 is attached to the rigid cylinder 91 and reflects light from a stationary light source 15 and a stationary fiber optic cable 14 to a stationary linear array 17. The moire fringe pattern is similar to that shown in FIG. 13 for the grating lines 63 on the rigid disk 86 and the grating lines 64 on the flexible disk 88. The embodiment in FIG. 17 is applicable when an end of the shaft 85 is optically accessible for torque measurements. For example, the shaft 85 might be driven at one end by a connection 95 such as a gear or pulley and with a load at the other end of shaft 85. Alternatively, the connection 95, such as a gear or pulley, might be to a load with the shaft driven from the opposite end.

FIG. 18 shows an alternative embodiment of the invention in which the optical means 183 of FIG. 17 is contained in the cavity 84 in the end of the shaft 85 which is connected by a coupling 96 to the shaft 85'. The coupling 96 contains a mirror system 97 with a conical reflective surface 98 to reflect input light from the stationary light source 15 via the fiber optic cable 14 to the optical means 183 and reflect the moire fringe pattern to the stationary linear array 17. As shown in FIG. 19, the coupling 96 blocks light reflected from the surface 98 over only a portion of each revolution of the shaft 85. The frequency of light blockage during rotation of the coupling 96 can be measured by suitable circuitry to indicate the speed of rotation of the shaft 85 in addition to the independent measurement of the torque in the shaft 85 according to this invention and both signals can be combined to indicate horsepower. For measurement of static torque when the shaft 85 is not rotating, means, not shown, are provided for movement of the stationary light source 15,14 and linear array 17 to a circumferential position where the coupling 96 does not block the light.

FIG. 20 shows another alternative embodiment of this invention, wherein both the disk 100 and the disk 101 are rigid. They are not connected at the outer periphery as they were in FIG. 12. As shown in FIG. 21 the grating lines 102 over a portion of the disk 100 are parallel and equally spaced with a spacing b and the grating lines 103 on the disk 101 are also parallel and equally spaced with a spacing b' When the disk 101 rotates through an angle $\theta$, moire fringe bands 104 are formed as shown in FIG. 21. When the moire fringe bands are in a position to be measured in the area 105 by the linear array 17 as shown in FIG. 20, the spacing of the bands 104 is a measure of the torque in the shaft 8.

As shown in FIG. 21, parallel grating lines 102,103 are provided on the disks 100,101, respectively at 90 degree intervals. Grating lines can be provided at more intervals to reduce the angle $\delta$ between grating intervals. An advantage of the embodiment of the invention shown in FIG. 20 is that both disks 100,101 can be rigid with no requirement to flex. A disadvantage is that torque measurements can be made only when the moire fringes 104 are in a position adjacent to the linear array 17 for measurement of the fringe spacing. For measurement of static torque with no rotation of shaft 8, means, not shown, are provided for automatic movement of the housing 9 via a connection 10' through an angle $\delta$ so that the linear array 17 is opposite the moire fringe bands 104. Typically, the area 106 between gratings is transparent but could be translucent or opaque. When the shaft 8 is rotating, the signal from the linear array 17 corresponding to the area 106 will correspond to constant light transmission followed by a fluctuating signal when the moire fringe bands are in a position to be measured. The frequency of the periods of constant light transmission corresponding to the areas 106 can be related to the speed of shaft rotation and combined with the torque measurement to yield a signal that is a function of horsepower.

The embodiment of the invention wherein both disks are rigid is feasible for rotating shafts since the disks can rotate relative to each other in response to torque about a common axis which is the shaft axis. This embodiment is also applicable to measurement of relative motion on flat surfaces provided the two rigid surfaces with grating lines are connected so as to pivot about a common center of rotation (or other suitably located centers of rotation), to change the angle between the grating lines.

Figure 22:
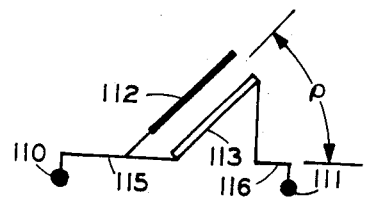

In most embodiments of this invention, however, it is more convenient for at least one of the two surfaces with grating lines to be flexible. Various embodiments have been described in which the surfaces with grating lines are either disks or cylinders. Actually, in the topological transformation between disks and cylinders, the surfaces can be at any angle $\rho$ as shown in FIG. 22. For an angle $\rho$ other than 0 degrees (cylinders) or 90 degrees (disks), the surfaces typically are conical and the grating lines on the surfaces are equally spaced but not parallel. Otherwise, the general principles of the invention as described for surfaces of disks or cylinders apply.

FIGS. 22,23,24, and 25 are schematic representations of the principles of this invention in several variations. Shown therein are: a reference point 110, a test point 111, a rigid connection 116 between the test point 111 and a flexible test surface means 113, a rigid connection 115 between the reference point 110 and a reference surface means 112,114 which may be a rigid reference surface means 112 (FIGS. 22 and 23) or a flexible reference surface means 114 (FIGS. 24 and 25), and a rigid bond connection 117 between one end of the surface means 112 and 113 or between one end of the surface means 113 and 114. The surface means 113 and 112 or 114 are adjacent and overlapping and at an angle "P" with a line between the reference point 110 and the test point 111, with typical values between 0 degrees and 90 degrees inclusive as shown in FIGS. 22-25 or equivalent values between 90 degrees and 360 degrees. In FIGS. 22-25, the designation of the left hand point as the reference point 110 and right hand point as the test point 111 is arbitrary and can be reversed. In FIGS. 22-25, the test point 111 is assumed to move relative to the reference point 110 in a direction perpendicular to the plane of the drawing.

To summarize, this invention provides apparatus and methods for indicating the relative positions in a given direction between a reference point 110 and a test point 111 spaced therefrom and movable relative thereto. A reference surface means 112,114, movable in response to movement of the reference point 110, has at least a relevant reference portion that is covered with a plurality of substantially equally spaced lines thereon predominantly in a direction normal to the given direction. Similarly, a test surface means 113, movable in response to movement of the test point 111, has a relevant portion that is substantially similar and parallel to the relevant reference portion of the reference surface means 112,114 and is covered with a plurality of substantially equally spaced lines thereon predominantly in a direction normal to the given direction. The relevant portion of each surface means 112,114 is adjacent and overlapping the relevant portion of the other surface means 113 throughout a useful range of relative positions and at least one relevant portion is substantially transparent (e.g. 112 or 113, 114 or 113, or all relevant portions 112,114, and 113 are transparent). The invention further comprises means 15,14 for illuminating the relevant portions to form moire fringes 30,70. Furthermore, the reference surface means 112,114 and the test surface means 113 are so arranged that relative movement between the test point 111 and the reference point 110 having a component in the given direction varies the angle $\theta$, $\alpha$ between the lines 20,25;63,64 on the relevant portions of the respective surface means 20,25;60,61 and thus causes the spacing of the moire fringes 30,70 formed by the lines 20,25;63,64 to vary as a function of the relative positions between the reference point 110 and the test point 111 in the given direction.

Figure 23:
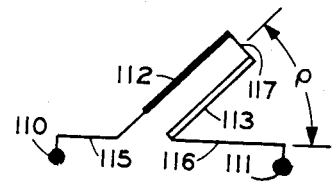
Figure 24:
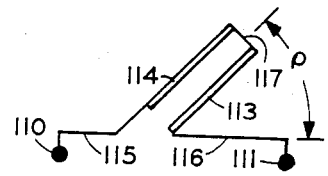
Figure 25:
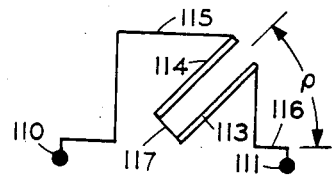

Typically, the reference surface means 112,114 is fixedly connected by a rigid connection 115 with the reference point 110, and the test surface means 113 is fixedly connected by a rigid connection 116 with the test point 111. As shown in FIG. 22, typically the reference surface means 112 is substantially rigid and the test surface means 113 is flexible, connected via the rigid connection 116 at one end of the test surface means 113 with the test point 111 and connected via the rigid connection 115 at the other end of test surface means 113 with the reference point 110; or alternatively, as shown in FIG. 23, the test surface means 113 is connected via the rigid bond 117 and via the rigid reference surface means 112 and the rigid connector 115 with the reference point 110; or alternatively, as shown in FIGS. 24 and 25, the reference surface means 114 can be flexible. Typically, the test point 111 can be located farther from the reference point 110 than is the test end of the flexible test surface means 113 so that the change in orientation of the lines thereon for a given change in relative positions of the reference point 110 and the test point 111 in the given direction is greater than it would be if the test end of the test surface means 113 and the test point 111 were at the same location and a similar option also applies to the relative position of the reference point 110 with respect to the reference end of the flexible test surface means 113.

In typical embodiments of the invention, the lines on each relevant portion of the surface means are oriented differently from the lines on the other relevant portion throughout the range of relative positions of the reference point 110 and the test point 111 and typically the test surface means 113 is positioned relative to the reference surface means 112,114 approximately midway in the range of relative positions of the surface means to serve as a reference positioning. The invention comprises means responsive to the spacing D of the moire fringes 30 for providing indications that are functions of the direction as well as the magnitude of any relative movement of the surface means from the reference positioning. Typically, the means responsive to the fringe spacing D comprises means 15,14 for illuminating the moire fringes 30 with transmitted or reflected light and means 17 for receiving light 17' diffracted by the overlapping lines. Typically, the light receiving means comprises also means 36,38,39,41 responsive to different light intensities for providing an electrical signal 42 that is a function of the spacing D of the fringes 30. Typically, the spacing responsive means 36,38,39,41 comprises means responsive to the signal 42 for providing indications that are a function of the spacing D between successive fringes 30. Typically, the indication providing means comprises means 17 for scanning a given region including a plurality of successive fringes 30 and means 36,38,39,41 responsive to changes in intensity of light 17' diffracted by the fringes 30. Typically, the intensity change responsive means 36,38,39,41 comprises means 36 for providing an electrical signal 37 that varies in magnitude as a function of light intensity 17' and typically comprising means 39,41 for providing an indication at 42 that is a function of the frequency of the electrical signal. Typically, the indication providing means 36,38,39,41 comprises means 39,41 for determining the number of fringes crossed by the scanning means 17,36,38 over the given region 31 and typically at a substantially constant rate and the number determining means 39,41 typically comprises means 41 for counting the transitions between high and low intensity during a given length of time.

The embodiment of this invention as shown in FIG. 12 can be clearly distinguished from the prior art such as (1) U.S. Patent No. 3,688,570, Burke, in the use of optical means consisting of disks and the measurement of the change in spacing of the moire fringe bands to determine both positive and negative torque and the direction of change in torque in a simple manner and (2) U.S. Patent No. 2,938,378, Canada et al, in the use of optical means such as disks with grating lines oriented such that the moire fringe bands formed are essentially concentric and their spacing in a radial direction is independent of whether static or dynamic torque is being measured. A greatly simplified system is provided by this invention compared to Canada et al in measuring torque rather than horsepower and with the unique ability to measure both positive and negative static torque and the direction of the static torque. This latter feature of this invention is important for application to shafts in vehicles where a measurement of torque is required starting from zero shaft rotation (i.e. static torque).

This invention has important torque sensing applications in vehicles and other applications involving rotatable shafts. However, the principles and concepts involved in this invention are not limited to measurement of torque in shafts. For example, flat rectangular transparent gratings as used in experimental work and depicted in FIG. 5 can be used to measure the bending motion in a plane perpendicular to the paper over a distance X in a non-rotating shaft or a plate or other structure.

While the forms of the invention herein disclosed constitute presently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

We claim:

1. Apparatus for indicating the relative positions in a given direction between a reference point and a test point spaced therefrom and movable relative thereto, comprising
   reference surface means movable in response to movement of the reference point, and having at least a relevant reference portion that is covered with a plurality of substantially equally spaced lines thereon predominantly in a direction normal to the given direction,
   test surface means movable in response to movement of the test point, and having at least a relevant test portion that is substantially similar and parallel to the relevant reference portion of the reference surface means, and covered with a plurality of substantially equally spaced lines thereon predominantly in a direction normal to the given direction,
   the relevant portion of each surface means being adjacent and overlapping the relevant portion of the other surface means throughout a useful range of relative positions, and at least one relevant portion being substantially transparent between the lines thereon, and
   means for illuminating the relevant portions to form moire fringes,
   the reference surface means and test surface means being so arranged that relative movement between the test point and the reference point having a component in the given direction varies the angle between the lines on the relevant portions of the respective surface means and thus causes the spacing of the moire fringes formed by the lines to vary as a function of the relative positions between the reference point and the test point in the given direction.

2. Apparatus as in claim 1, wherein the lines on each relevant portion are oriented differently from the lines on the other relevant portion throughout the range of relative positions of the reference point and test point.

3. Apparatus as in claim 2, wherein a selected relative positioning of the reference point and test point approximately midway in the range of positions serves as a reference positioning, and further comprising means responsive to the spacing of the moire fringes for providing indications that are functions of the direction as well as the magnitude of any relative movement of the points from the reference positioning.

4. Apparatus as in claim 1, wherein the lines on the relevant portions of the surfaces are substantially parallel.

5. Apparatus as in claim 1, wherein the lines on the relevant portions of the surfaces are at equal angles to each other.

6. Apparatus as in claim 1, wherein the lines on the relevant portions of the surfaces are equally spaced at a given distance from an end of the surface means.

7. Apparatus as in claim 3, wherein the means responsive to the fringe spacing comprises means for receiving light diffracted by the overlapping lines.

8. Apparatus as in claim 7, wherein the means for receiving light diffracted by the overlapping lines comprises a plurality of fiber optic cables.

9. Apparatus as in claim 8, wherein the ends of the fiber optic cables are arranged linearly in an array oriented substantially perpendicular to the moire fringes.

10. Apparatus as in claim 7, wherein the means responsive to fringe spacing comprises a plurality of photodetectors arranged linearly in an array oriented substantially perpendicular to the moire fringes.

11. Apparatus as in claim 7, wherein the light receiving means comprises also means responsive to the different light intensities for providing an electrical signal that is a function of the spacing of the fringes.

12. Apparatus as in claim 7, wherein the means responsive to the fringe spacing comprises means for providing indications that are a function of the spacing between successive fringes formed by the overlapping lines.

13. Apparatus as in claim 12, wherein the indication providing means comprises means for scanning a given region including a plurality of successive fringes, and means responsive to changes in the intensity of light diffracted by the fringes.

14. Apparatus as in claim 13, wherein the intensity change responsive means comprises means for providing an electrical signal that varies in magnitude as a function of the light intensity.

15. Apparatus as in claim 14, comprising also means for providing an indication that is a function of the frequency of the electrical signal.

16. Apparatus as in claim 15, wherein the indication providing means comprises means for determining the number of fringes crossed by the scanning means over the given region.

17. Apparatus as in claim 16, wherein the scanning means scans the given region at a substantially constant rate, and the number determining means comprises means for counting the transitions between high and low light intensity during a given length of time.

18. Apparatus as in claim 1, wherein the reference point and the test point are points on a shaft and the relative positions between the points is a function of a force applied to, and tending to twist, the shaft.

19. Apparatus as in claim 1, wherein the reference point and the test point are points on a planar surface and the relative positions between the points is a function of a force applied to, and tending to twist or bend, the planar surface.

20. Apparatus as in claim 18, comprising also means responsive to the electric signal for controlling the force applied to the shaft.

21. Apparatus as in claim 18, wherein the shaft is held substantially stationary.

22. Apparatus as in claim 18, wherein the shaft is allowed to rotate.

23. Apparatus as in claim 1, wherein the reference surface means is fixedly connected with the reference point, and the test surface means is fixedly connected with the test point.

24. Apparatus as in claim 23, wherein the reference surface means and the test surface means are substantially rigid with at least one surface means pivotable.

25. Apparatus as in claim 24, wherein the reference surface means and the test surface means are normal to the axis about which one surface is pivotable.

26. Apparatus as in claim 23, wherein the reference surface means is substantially rigid, and the test surface means is flexible and connected at one end with the test point and at the other end with the reference point.

27. Apparatus as in claim 26, wherein the connection of the test surface means with the reference point is made via the reference surface means.

28. Apparatus as in claim 23, wherein the reference surface means is flexible and connected at one end with the reference point, the test surface means is flexible and connected at one end with the test point, and the reference surface means is connected at the other end with the other end of the test surface means.

29. Apparatus as in claim 1, wherein at least one relevant portion comprises a transparent material with opaque grating lines thereon.

30. Apparatus as in claim 1, wherein at least one relevant portion comprises a flexible transparent plastic material with opaque grating lines thereon.

31. Apparatus as in claim 1, wherein at least one relevant portion comprises equally-spaced lines of opaque material separated by voids.

32. Apparatus as in claim 30, wherein the flexible plastic is polycarbonate, polysulfone, or polyether sulfone.

33. Apparatus for indicating the relative angular positions between a reference point and a test point axially spaced therefrom and coaxially movable relative thereto, comprising reference surface means fixedly connected with the reference point, and having at least a relevant reference portion that is substantially cylindrical, coaxial with the relative movement, and covered with a plurality of substantially equally spaced and predominantly axial lines thereon, test surface means fixedly connected at a reference end thereof with the reference point, fixedly connected at a test end thereof with the test point, and having at least a flexible relevant test portion that is substantially cylindrical, coaxial with the relative movement, and covered with a plurality of substantially equally spaced and predominantly axial lines thereon, the relevant portion of each surface means being adjacent and overlapping the relevant portion of the other surface means throughout a useful range of relative angular positions, and at least one relevant portion being substantially transparent between the lines thereon, and means for illuminating the relevant portions to form moire fringes, coaxial relative movement between the test point and the reference point thus varying the relative orientation between the lines on the relevant portions of the respective surface means and causing the spacing of the moire fringes formed by the lines to vary as a function of the relative angular positions between the reference point and the test point.

34. Apparatus as in claim 33, wherein the test point is located farther from the reference point than is the test end of the flexible portion of the test surface means, so that the change in orientation of the lines thereon for a given change in relative positions of the reference point and test point is greater than it would be if the test end of the test surface means and the test point were at the same location.

35. Apparatus as in claim 33, wherein the reference point is located farther from the test point than is the reference end of the flexible portion of the test surface means, so that the change in orientation of the lines thereon for a given change in relative angular positions of the reference point and test point is greater than it would be if the reference end and the reference point were at the same location.

36. Apparatus for indicating the relative angular positions between a reference point and a test point axially spaced therefrom and coaxially movable relative thereto, comprising substantially rigid reference surface means fixedly connected with the reference point, and having at least a relevant reference portion that is substantially flat, normal to the axis of relative movement, and covered with a plurality of substantially equally spaced and predominantly radial lines thereon, test surface means fixedly connected at a reference end thereof with the reference point, fixedly connected at a test end thereof with the test point, and having at least a flexible relevant test portion that is substantially flat, normal to the axis of relative movement, and covered with a plurality of substantially equally spaced and predominantly radial lines thereon, the relevant portion of each surface means being adjacent and overlapping the relevant portion of the other surface means throughout a useful range of relative angular positions, and at least one relevant portion being substantially transparent between the lines thereon, and means for illuminating the relevant portions to form moire fringes, coaxial relative movement between the test point and the reference point thus varying the relative orientation between the lines on the relevant portions of the respective surface means and causing the spacing of the moire fringes formed by the lines to vary as a function of the relative angular positions between the reference point and the test point.

* * * * *